(12) United States Patent
Jeon et al.

(10) Patent No.: US 9,356,958 B2
(45) Date of Patent: May 31, 2016

(54) APPARATUS AND METHOD FOR PROTECTING COMMUNICATION PATTERN OF NETWORK TRAFFIC

(71) Applicant: ELECTRONICS AND TELECOMMUNICATIONS RESEARCH INSTITUTE, Daejeon (KR)

(72) Inventors: Sungho Jeon, Busan (KR); Jeong-Han Yun, Daejeon (KR); Woonyon Kim, Daejeon (KR); Jungtaek Seo, Daejeon (KR); Choon Soo Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/444,794

(22) Filed: Jul. 28, 2014

(65) Prior Publication Data

US 2015/0089646 A1 Mar. 26, 2015

(30) Foreign Application Priority Data

Sep. 25, 2013 (KR) .................. 10-2013-0113929

(51) Int. Cl.
*H04L 29/06* (2006.01)

(52) U.S. Cl.
CPC ........ *H04L 63/1491* (2013.01); *H04L 63/1475* (2013.01)

(58) Field of Classification Search
CPC .................... H04L 63/1475; H04L 63/1491
See application file for complete search history.

(56) References Cited

U.S. PATENT DOCUMENTS

| 6,405,313 | B1* | 6/2002 | Reiter ................ G06Q 20/3821 |
| | | | 709/238 |
| 6,829,709 | B1* | 12/2004 | Acharya ............... H04L 63/164 |
| | | | 370/338 |
| 7,647,411 | B1* | 1/2010 | Schiavone .................... 709/206 |
| 7,657,913 | B2* | 2/2010 | Pedlow, Jr. ......... H04N 21/2181 |
| | | | 370/431 |
| 2006/0041653 | A1 | 2/2006 | Aaron |

(Continued)

FOREIGN PATENT DOCUMENTS

| JP | 2002-271302 A | 9/2002 |
| JP | 2011-003974 A | 1/2011 |
| KR | 10-2009-0127597 A | 12/2009 |
| KR | 10-2010-0078584 A | 7/2010 |
| KR | 10-1135345 B1 | 4/2012 |

OTHER PUBLICATIONS

Charles V. Wright et al., "Traffic Morphing: An Efficient Defense Against Statistical Traffic Analysis," NDSS, 2009.

(Continued)

*Primary Examiner* — Mohammad A Siddiqi
(74) *Attorney, Agent, or Firm* — LRK Patent Law Firm

(57) ABSTRACT

An apparatus for protecting traffic trend in a network of a control system using artificial communication is provided. In accordance with an embodiment, the apparatus includes a communication terminal device installed in a network and configured to create and filter artificial communication. A communication server device determines whether to create artificial communication at a current time in the communication terminal device, requests a transmitting side-communication terminal device to create artificial communication, and requests a receiving side-communication terminal device to filter the artificial communication.

11 Claims, 7 Drawing Sheets

(56) References Cited

U.S. PATENT DOCUMENTS

| | | | | |
|---|---|---|---|---|
| 2007/0047457 | A1* | 3/2007 | Harijono | H04L 49/90 370/250 |
| 2009/0168763 | A1* | 7/2009 | Choi | H04W 28/26 370/352 |
| 2010/0304706 | A1* | 12/2010 | Haverty | H04K 3/45 455/404.1 |
| 2014/0245435 | A1* | 8/2014 | Belenky | H04L 63/126 726/22 |

OTHER PUBLICATIONS

Scott E Coull et al., "Playing Devil's Advocate: Inferring Sensitive Information from Anonymized Network Traces," Network and Distributed System Security Symposium, 2007.

Xinwen Fu et al., "On effectiveness of link padding for statistical traffic analysis attacks," Proceedings of the 23rd International Conference on Distributed Computing Systems, 2003.

* cited by examiner

APPARATUS AND METHOD FOR PROTECTING COMMUNICATION PATTERN OF NETWORK TRAFFIC

CROSS REFERENCE TO RELATED APPLICATION

This application claims the benefit of Korean Patent Application No. 10-2013-0113929, filed on Sep. 25, 2013, which is hereby incorporated by reference in its entirety into this application.

BACKGROUND OF THE INVENTION

1. Technical Field

The present invention relates generally to an apparatus and method for protecting a communication pattern of network traffic and, more particularly, to an apparatus and method that protect the change and communication pattern of traffic in the network of a control system using artificial communication.

2. Description of the Related Art

Generally, in a Supervisory Control And Data Acquisition (SCADA), Cyber Physical Systems (CPS), and national infrastructure systems in which the update of a security antivirus program is difficult, it is difficult to maintain an attack signature-based intrusion detection system. Further, since it is also difficult detect attacks on national infrastructures aiming at a specific organization in an attack signature manner, research into anomaly-based intrusion detection systems (A-IDS) has been actively conducted in national infrastructures.

However, when an attacker monitors the normal communication patterns of SCADA or national infrastructure systems and obtains a normal profile, a anomaly-based intrusion detection system (A-IDS) may be incapacitated.

In the past, pieces of research into techniques for preventing attacks to leak the personal information of users from traffic in an Information Technology (IT) network were conducted. Korean Patent Application Publication No. 10-2010-0078584 discloses technology relating to a multi-encryption apparatus and method for SCADA communication security. Further, the paper "Traffic morphing: An efficient defense against statistical traffic analysis" proposes a method of preventing information leakage attacks at low cost by utilizing a classifier, instead of a method of encrypting contents by applying a convex optimization technique to traffic that is transmitted using a Secure Sockets Layer (SSL) method or the like. However, there is a problem in that traffic is transmitted without being encrypted in a control system, so that, if an attacker directly monitors traffic, the attacker can view even the contents of traffic, thus making it difficult to apply this method.

SUMMARY OF THE INVENTION

Accordingly, the present invention has been made keeping in mind the above problems occurring in the prior art, and an object of the present invention is to provide an apparatus and method that prevent an attacker from detecting the change and communication pattern of normal network traffic via artificial communication in a control system.

In accordance with an aspect of the present invention to accomplish the above object, there is provided a communication server device in an apparatus for protecting a communication pattern of network traffic, including a creation determination unit for determining whether to create artificial communication during performance of normal communication over a network, and a creation requesting unit for, if the creation determination unit determines to create artificial communication, requesting a transmitting side-communication terminal device of the network to create artificial communication.

Preferably, the creation determination unit may calculate a probability of artificial communication being created in consideration of a communication period of the network, and determines whether to create artificial communication, based on the calculated artificial communication creation probability.

Preferably, the creation determination unit may calculate a normal distribution, having a value corresponding to half of the communication period of the network as a mean, as the artificial communication creation probability.

Preferably, the creation determination unit may determine whether to create the artificial communication by additionally considering a preset creation determination time.

Preferably, the creation determination unit may generate a random number value every creation determination time, compare a creation probability for a value based on a current time with the random number value, and then determine whether to create artificial communication at the current time.

Preferably, the value based on the current time may be a resulting value obtained by performing a modulo operation on the current time by the creation determination time.

Preferably, the creation requesting unit may request a receiving side-communication terminal device to filter the artificial communication received from the transmitting side-communication terminal device.

In accordance with another aspect of the present invention to accomplish the above object, there is provided a communication terminal device in an apparatus for protecting a communication pattern of network traffic, including a communication creation unit for, if an artificial communication creation request is received from a communication server device, creating artificial communication, a transmission/reception unit for transmitting the created artificial communication to a receiving side-communication terminal device, and receiving artificial communication from a transmitting side-communication terminal device, and a filtering unit for, if an artificial communication filtering request is received from the communication server device, filtering the artificial communication received from the transmitting side-communication terminal device.

Preferably, the communication terminal device may further include a response message generation unit for, if the artificial communication is received or filtered, generating a response message to results of reception or filtering based on a predefined response template.

In accordance with a further aspect of the present invention to accomplish the above object, there is provided a method for protecting a communication pattern of network traffic, including determining whether to create artificial communication during performance of normal communication over a network, and if it is determined to create artificial communication, requesting a transmitting side-communication terminal device of the network to create artificial communication.

Preferably, determining whether to create artificial communication may be configured to calculate a probability of artificial communication being created in consideration of a communication period of the network, and determine whether to create artificial communication, based on the calculated artificial communication creation probability.

Preferably, determining whether to create artificial communication may be configured to calculate a normal distribution, having a value corresponding to half of the communication period of the network as a mean, as the artificial communication creation probability.

Preferably, determining whether to create artificial communication may be configured to determine whether to create the artificial communication by additionally considering a preset creation determination time.

Preferably, determining whether to create artificial communication may include generating a random number value every creation determination time and comparing a creation probability for a value based on a current time with the random number value.

Preferably, the value based on the current time may be a resulting value obtained by performing a modulo operation on the current time by the creation determination time.

Preferably, the method may further include requesting a receiving side-communication terminal device to filter the artificial communication created by the transmitting side-communication terminal device.

DESCRIPTION OF THE PREFERRED EMBODIMENTS

Figure 1:
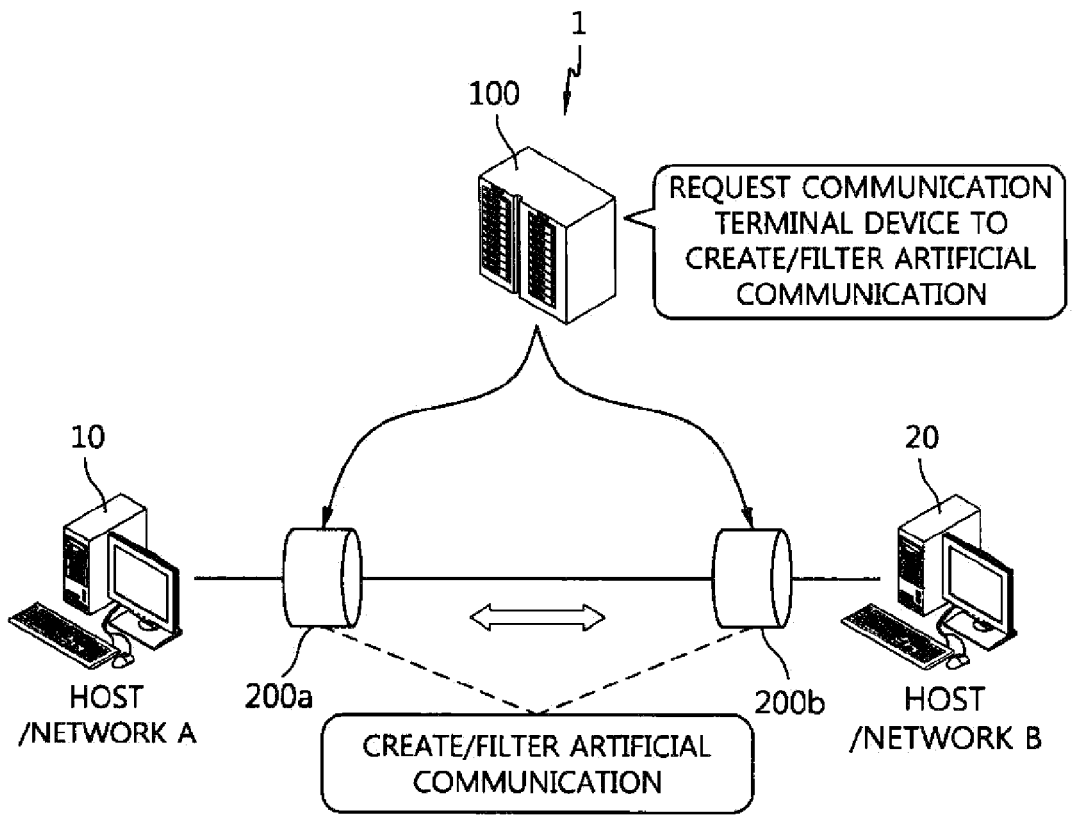
FIG. 1 is a diagram showing a system for protecting a communication pattern of network traffic according to an embodiment.

Details of other embodiments are included in detailed description and attached drawings. The features and advantages of technology disclosed in the present invention and methods for achieving them will be more clearly understood from a detailed description of the following embodiments taken in conjunction with the accompanying drawings. Reference now should be made to the drawings, in which the same reference numerals are used throughout the different drawings to designate the same or similar components.

Hereinafter, embodiments of an apparatus and method for protecting a communication pattern of network traffic using artificial communication will be described in detail with reference to the attached drawings.

FIG. 1 is a diagram showing a system for protecting a communication pattern of network traffic using artificial communication according to an embodiment.

As shown in FIG. 1, when communication is performed between host/network A 10 and host/network B 20 in a control system, an attacker can obtain a normal profile by monitoring the change or communication pattern of traffic that is exchanged between the hosts or networks 10 and 20. Once an attacker obtains the normal profile, a system for monitoring the intrusion of the control system based on a symptom can be easily incapacitated.

In order to prevent this situation, referring to FIG. 1, a system 1 for protecting a communication pattern of network traffic using artificial communication according to an embodiment may include a communication server device 100 and communication terminal devices 200a and 200b.

Below, for convenience of description, a description will be made on the assumption that communication is performed between host A 10 and host B 20 in the control system.

The communication terminal devices 200a and 200b are installed on the preceding ends of the hosts 10 and 20 and are configured to create artificial communication during normal communication performed between the hosts 10 and 20, thus preventing an attacker from detecting the pattern of the normal communication. In this case, the communication terminal devices 200a and 200b perform filtering so that the created artificial communication is not transferred to the hosts 10 and 20.

The communication server device 100 requests the communication terminal device 200a located on the preceding end of the transmitting side-host A 10 to create artificial communication (for example, a dummy packet) and transmits information required to filter the artificial communication to the communication terminal device 200b located on the preceding end of the receiving side-host B 20 while communicating with the communication, terminal devices 200a and 200b, thus preventing the artificial communication from being transferred to the host B 20.

Although, for convenience of description, it is assumed that the host A 10 is a transmitting side-host, and the host B 20 is a receiving side-host, and vice versa.

Figure 2:
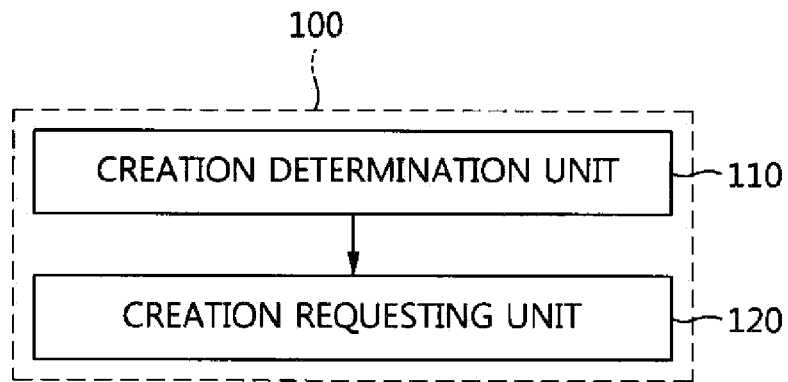
FIG. 2 is a block diagram showing the communication server device of the system for protecting a communication pattern of network traffic according to an embodiment.

FIG. 2 is a block diagram showing the communication server device of the system for protecting a communication pattern of network traffic according to an embodiment. The communication server device 100 according to an embodiment will be described in more detail with reference to FIG. 2.

As shown in the drawing, the communication server device 100 may include a creation determination unit 110 and a creation requesting unit 120.

When normal communication is performed between host A and host B as shown in FIG. 1, the creation determination unit 110 determines whether to create artificial communication required to hide the periodicity of normal communication.

In accordance with an embodiment, the creation determination unit 110 may calculate the probability of artificial communication being created, and determine whether to create artificial communication using the calculated creation probability. In this case, it is effective for the creation determination unit 110 to create artificial communication at a point having a large difference with the period time of normal communication so as to hide the period time of normal communication. Accordingly, the creation probability for artificial communication may be calculated in consideration of the communication period of the network.

For example, if the communication period time of the network is assumed to be 8.2 seconds, it is more effective to create artificial communication at a point corresponding to about 4 seconds than at points near 0 second and 8.2 seconds.

However, a case where artificial communication is always created at a point corresponding to 4 seconds may also form a pattern.

Figure 3:
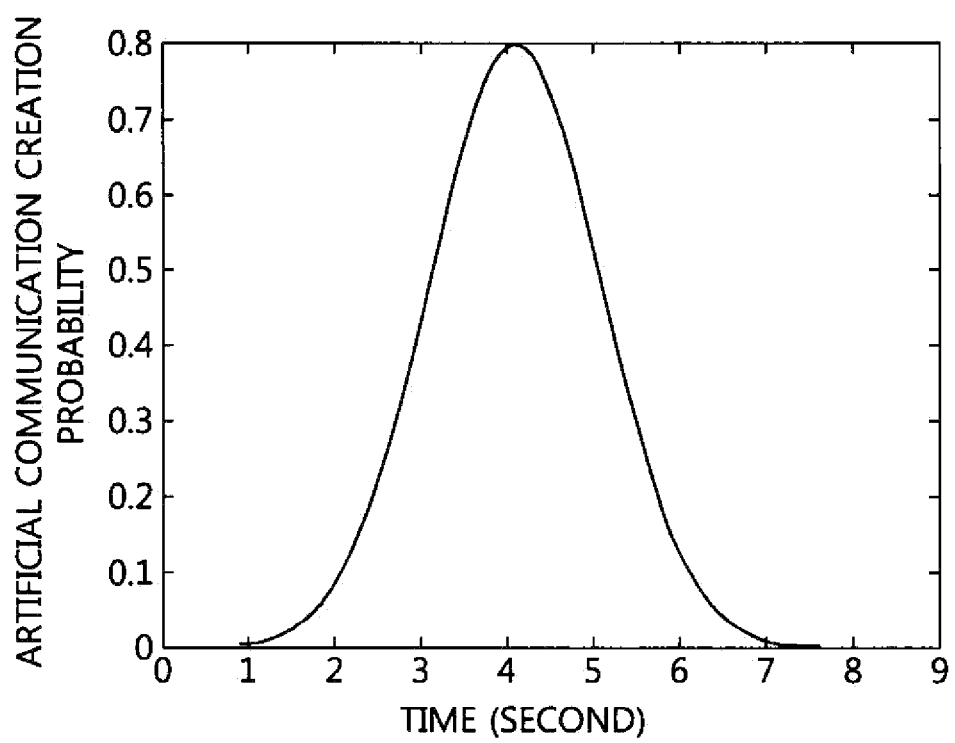
FIG. 3 is a diagram showing an artificial communication creation probability graph according to an embodiment.

Therefore, as shown in FIG. 3, the creation determination unit 110 may calculate a normal distribution, having a value corresponding to half (for example, 4 seconds) of the communication period (for example, 8 seconds) of the network as a mean, as the artificial communication creation probability.

However, this is only an example, and various other probability distributions may be calculated as the creation probability, and, in addition, creation probability information directly input by the user may also be used.

The creation determination unit 110 may determine whether to create artificial communication at a current time whenever each unit time (for example, 1 second) has elapsed, by utilizing the calculated creation probability.

In this case, the creation determination unit 120 may determine whether to create artificial communication at a current time by additionally considering a creation determination time that is a parameter preset to adjust the amount of artificial communication.

For example, when the unit time is 1 second and the creation determination time is 3 seconds, a modulo operation is performed on each current time by the creation determination time whenever a unit time of 1 second has elapsed. Further, a random number value is generated every 3 seconds corresponding to the creation determination time, and is compared with a creation probability value for the resulting value of the modulo operation. If the random number value is less than the creation probability value, it may be determined that artificial communication is to be created. In this case, the random number value may be a value which is equal to or greater than 0 and is less than or equal to 1.

In this way, in order to effectively hide the pattern period of normal communication from an attacker, it is possible to increase the creation probability for artificial communication as the time gets closer to half of the period of normal communication. However, at this time, in order to reduce the probability of the pattern period of artificial communication being leaked to the attacker, the amount of artificial communication may be adjusted using the creation determination time parameter. As the creation determination time becomes shorter, there is a higher opportunity to create artificial communication, and thus the amount of artificial communication is increased.

Until now, the example in which the creation determination unit 110 calculates the communication creation probability and creates artificial communication so as to prevent the period of normal communication from being leaked has been described, but the present invention is not necessarily limited to such an example, and may be modified and implemented in various other manners.

If the creation determination unit 110 determines to create artificial communication at a current time, the creation requesting unit 120 may request the transmitting side-communication terminal device to create artificial communication by transmitting request information to the transmitting side-communication terminal device.

Further, the creation requesting unit 120 may request filtering so that received artificial communication is not transferred to the host by transmitting information about artificial communication created by the transmitting side-communication terminal device to the receiving side-communication terminal device.

Figure 4:
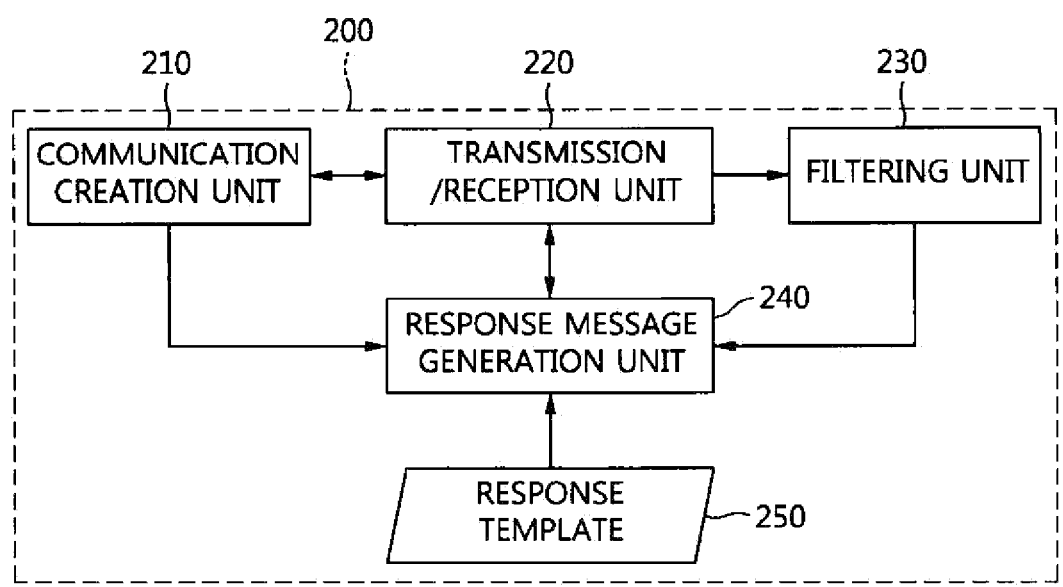
FIG. 4 is a block diagram showing the communication terminal device of the system for protecting a communication pattern of network traffic according to an embodiment.

FIG. 4 is a block diagram showing the communication terminal device of the system for protecting a communication pattern of network traffic according to an embodiment.

Referring to FIG. 4, a communication terminal device 200 may be either the transmitting side-communication terminal 200a or the receiving side-communication terminal 200b of the system 1 for protecting a communication pattern of network traffic according to the embodiment of FIG. 1.

Referring to FIGS. 1 and 4, the communication terminal device 200 may include a communication creation unit 210, a transmission/reception unit 220, a filtering unit 230, and a response message generation unit 240.

The transmission/reception unit 220 transmits/receives various types of data between the communication server device 100 and the communication terminal device 200a or 200b.

For example, the transmission/reception unit 220 may receive, from the communication server device 100, a request to create artificial communication at a current time and a request to filter artificial communication received from another communication terminal device 200. Further, the transmission/reception unit 220 may transmit the results of reception of artificial communication, the results of filtering, etc. to a counterpart communication terminal device 200 or the communication server device 100 in the form of a response message.

The communication creation unit 210 is configured to, when the request to create artificial communication at a current time is received from the communication server device 100, create artificial communication such as a pre-designated dummy packet, and transmit the artificial communication to the counterpart communication terminal device 200 via the transmission/reception unit 220.

If the artificial communication has been created, the response message generation unit 240 may generate a response message to the results of creation and send the response message to the communication server device 100.

In this case, if it is determined that normal communication is being performed, the communication creation unit 210 may ignore an artificial communication creation request received from the communication server device 100 as necessary, and may allow the response message generation unit 240 to generate a response message to the results thereof and send the response message to the communication server device 100.

If such a response message is received from the communication terminal device 200, the communication server device 100 may request the counterpart communication terminal device 200 to filter artificial communication by providing information required to filter the artificial communication to the counterpart communication terminal device 200 based on the response message.

The filtering unit 230 is configured to, when the communication terminal device 200 is located on the preceding end of the receiving side-host, if an artificial communication filtering request is received from the communication server device 100 through the transmission/reception unit 220, filter the artificial communication received from the transmitting side-communication terminal device 200 using the filtering information received from the communication server device 100, thus preventing the artificial communication from being transferred to the host.

If the artificial communication is normally filtered, the response message generation unit 240 may generate a response message to the results of the filtering and transmit the response message to the counterpart communication terminal device 200 or the communication server device 100.

In this case, the communication terminal device 200 may previously store a response template 250 for the artificial communication, and the response message generation unit 240 may generate a response message suitable for a current situation with reference to the response template 250.

Figure 5:
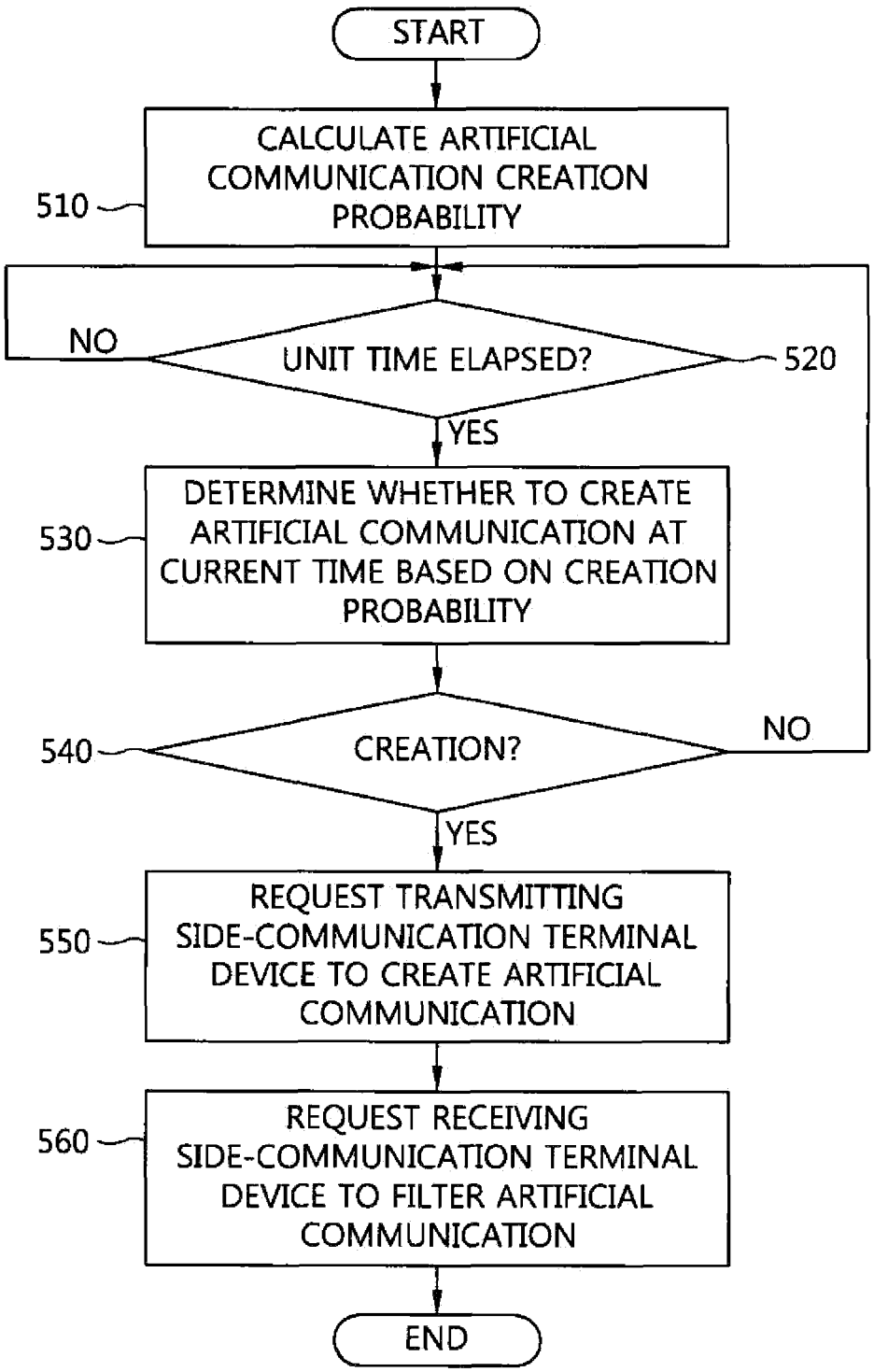
FIG. 5 is a flowchart showing a method for protecting a communication pattern of network traffic, performed by the communication server device, according to an embodiment.

FIG. 5 is a flowchart showing a method of protecting a communication pattern of network traffic, performed by the communication server device, according to an embodiment. The flowchart of FIG. 5 may be an example of a pattern protection method performed by the communication server device 100 according to the embodiment of FIG. 1.

Referring to FIG. 5, the communication server device 100 may calculate the probability of artificial communication being created at step 510.

As described in detail above, in order to hide the periodicity of normal communication performed between host A and host B of FIG. 1, the communication server device 100 calculates the probability of artificial communication being created. In order to improve the effects of creation, artificial communication is created at a point having a large difference with the period time of normal communication in such a way that a normal distribution, having a value corresponding to half of the communication period of the network as a mean, may be calculated as the artificial communication creation probability.

Next, if a unit time (for example, 1 second) has elapsed at step 520, the communication server device determines whether to create artificial communication at a current time at which each unit time has elapsed, by using the creation probability at step 530. In this case, if the unit time has not yet elapsed at step 520 or if it is not determined at step 530 that artificial communication is to be created at the current time, the communication server device waits until a subsequent unit time elapses.

Next, if it is determined that artificial communication is to be created at the current time at step 540, the communication server device requests the transmitting side-communication terminal device to create artificial communication at step 550, and requests the receiving side-communication terminal device to filter the artificial communication at step 560.

Figure 6:
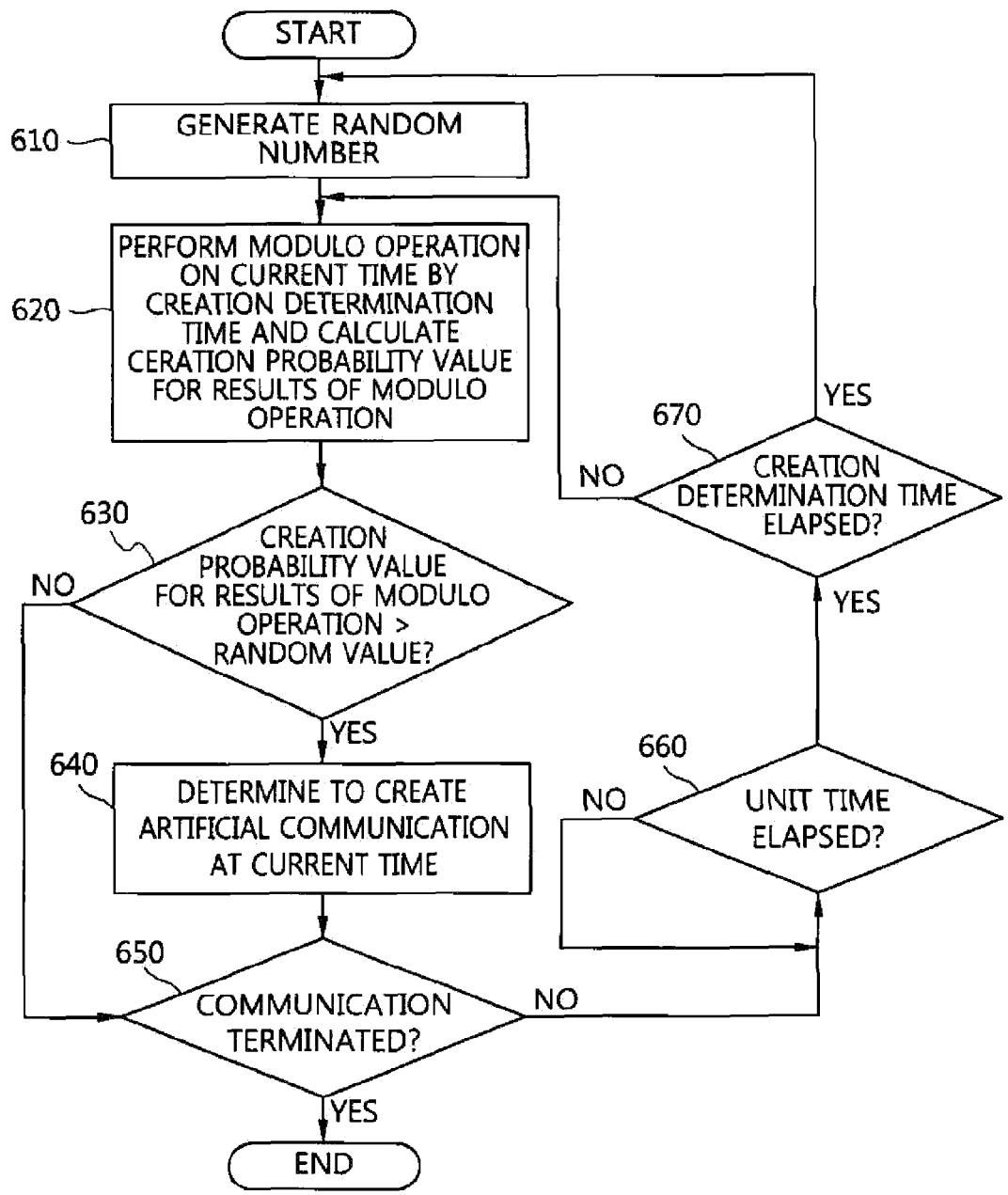
FIG. 6 is a flowchart showing a method of determining whether to create communication in the method for protecting a communication pattern of network traffic according to an embodiment.

FIG. 6 is a flowchart showing a method of determining whether to create communication in the method of protecting a communication pattern of network traffic according to an embodiment. The flowchart of FIG. 6 may be an example of a pattern protection method, performed by the communication server device 100, according to the embodiment of FIG. 1.

A method of determining whether to create artificial communication according to an embodiment will be described in detail with reference to FIG. 6.

First, the communication server device 100 initially generates a random number value at step 610, performs a modulo operation on a current time by a creation determination time, and calculates a creation probability value for the results of the modulo operation at step 620.

Then, the communication server device 100 compares the random number value with the creation probability value for the results of the modulo operation, and if the random number value is less than the creation probability value at step 630, determines to create artificial communication at a current time at step 640.

Thereafter, the communication server device determines whether the normal communication of the network has been terminated at step 650. If it is determined that communication has not yet been terminated, the communication server device determines whether a preset unit time has elapsed so as to determine whether to create artificial communication at a subsequent time at step 660.

If it is determined that the unit time has not yet elapsed at step 660, the communication server device waits until the unit time elapses, whereas if it is determined that the unit time has elapsed at step 660, the communication server device determines whether the preset creation determination time has elapsed at step 670.

If it is determined that the preset creation determination time has elapsed at step 670, the communication server device recalculates a random number at step 610, and performs steps after step 610. In this case, if it is determined that the creation determination time has not elapsed at step 670, the process returns to step 620 of performing a modulo operation on a current time.

Such a procedure is repeated until the communication of the network is completely terminated.

Figure 7:
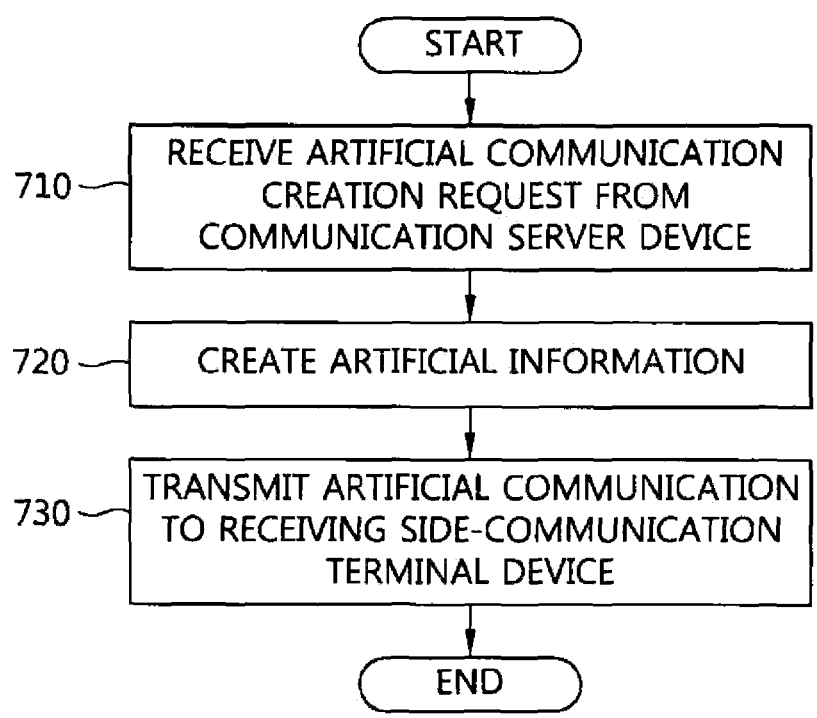
FIG. 7 is a flowchart showing a method for protecting a communication pattern of network traffic, performed by a transmitting side-communication terminal device, according to an embodiment.
Figure 8:
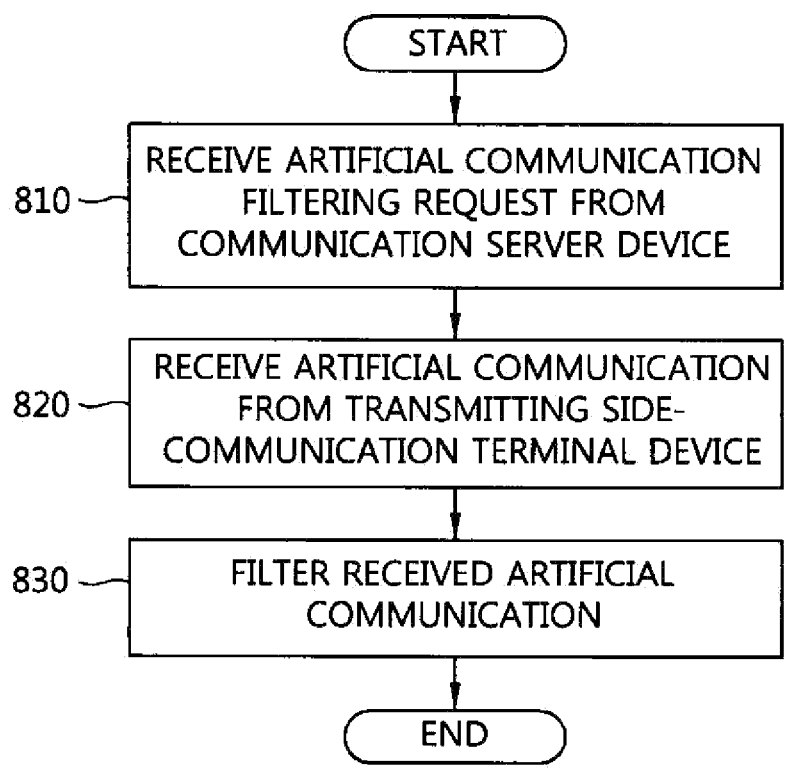
FIG. 8 is a flowchart showing a method for protecting a communication pattern of network traffic, performed by a receiving side-communication terminal device according to an embodiment.

FIG. 7 is a flowchart showing a method of protecting a communication pattern of network traffic, performed by a transmitting side-communication terminal device, according to an embodiment. FIG. 8 is a flowchart showing a method of protecting a communication pattern of network traffic, performed by a receiving side-communication terminal device according to an embodiment.

The methods of FIGS. 7 and 8 may be performed by the communication terminal devices 200a and 200b according to the embodiment of FIG. 1. In this case, if it is assumed that the communication terminal device 200a is a transmitting side-communication terminal device, and the communication terminal device 200b is a receiving side-communication terminal device, the procedure of FIG. 7 may be performed by the transmitting side-communication terminal device 200a and the procedure of FIG. 8 may be performed by the receiving side-communication terminal device 200b.

Referring to FIG. 7, the communication terminal device 200a receives request information required to create artificial communication from the communication server device 100 at step 710.

If the artificial communication creation request has been received at step 710, the communication terminal device 200a creates artificial communication at step 720, and transmits the created artificial communication to the receiving side-communication terminal device 200b at step 730. In this case, the communication terminal device 200a may transmit information required to filter the created artificial communication to the communication server device 100.

Referring to FIG. 8, the receiving side-communication terminal device 200b receives filtering request information including the information required to filter the artificial communication from the communication server device 100 at step 810.

Then, the receiving side-communication terminal device 200b receives the artificial communication from the transmitting side-communication terminal device 200a at step 820, and filters the received artificial communication at step 830.

The above embodiments may be applied to the intrusion detection system of a typical control system. For example, those embodiments may be used to create artificial communication for Distributed Network Protocol 3 (DNP3) functioning to monitor or control field facilities among protocols used in the typical control system.

In accordance with the disclosed embodiments, in order to create artificial DNP3 communication, a DNP3 function code, a DNP3 object, a DNP3 communication template, etc. may be created in advance. In this case, the DNP3 function code for artificial communication may be acquired by previously collecting pieces of data for a predetermined period of time, and a function code ratio obtained through such a code may be used as a creation probability for artificial communication. Alternatively, the manager of the control system may randomly set the creation probability.

The DNP3 object varies according to the DNP3 function code. Therefore, it may be determined after an artificial DNP3 function code has been created. An artificial DNP3 object differs depending on each network, and even in the case of the same DNP3 function code, the artificial DNP3 object differs depending on a target on which DNP3 communication is performed, and thus there is a need to hide the artificial DNP3 object.

Therefore, DNP3 object frequency distribution is investigated from data per connection in which DNP3 communication is used, and thus the ratio of DNP3 object frequencies investigated depending on individual connections used in the overall system may be used as the creation probability. Alternatively, the creation probability may be randomly set by the manager. That is, the frequency and mean of DNP3 objects used in the overall system may be applied differently depending on individual connections.

Then, the DNP3 communication template may be investigated in advance and may be stored in each communication terminal device. This communication template may include an object, a response function code, and a response message (acknowledge) depending on the function code.

Further, the disclosed embodiments may also be applied to a structure for creating artificial communication for a receiving side-Internet Protocol (IP) address or port and preventing a communication pattern from being leaked. This makes it appear as if communication is performed between hosts which do not originally perform communication, thus preventing the period or the like of normal communication between hosts, which actually perform communication, from being leaked.

In accordance with the present invention, even if, in a control system, an attacker monitors traffic or communication, the change or pattern of traffic can be hidden via an artificial communication scheme so that the pattern or profile of normal communication cannot be found. Accordingly, since the attacker cannot independently generate a normal profile via monitoring, a anomaly-based intrusion detection system (A-IDS) may be protected.

Those skilled in the art to which the present embodiments pertain will appreciate that the present invention may be implemented in other detailed forms without changing the technical spirit or essential features of the present invention. Therefore, the above-described embodiments should be understood to be exemplary rather than restrictive in all aspects.

What is claimed is:

1. An apparatus, comprising:
a server for protecting communication pattern between parties in a network, the sever comprising one or more units which being configured and executed by a hardware processor using algorithms which associated with least one non-transitory storage device, the algorithm which when executed, causes the processor to perform the one or more units, the one or more units comprising,
a creation determination unit for determining whether to create artificial communication during performance of normal communication over a network, the determining to create the artificial communication is performed using the following algorithm,
in response to detection of communication period of the network, the creation determination unit for calculating a probability of artificial communication based on the communication period,
in response to detection of predetermined unit time being elapsed, the creation determination unit for determining to create artificial communication at current time based on the calculated probability of the artificial communication, wherein a random number value of the current time is resulting value obtained by performing a modulo operation on the current time,
in response to detection of the creation of the artificial communication,
a creation requesting unit for requesting a transmitting side-communication terminal device of the network to create artificial communication, and requesting receiving side-communication terminal device to filter artificial communication,
wherein the creation determination unit calculates a normal distribution, having a value corresponding to half of the communication period of the network as a mean, as the artificial communication creation probability.

2. The communication server device of claim 1, wherein the creation determination unit determines whether to create the artificial communication by additionally considering a preset creation determination time.

3. The communication server device of claim 2, wherein the creation determination unit generates a random number value every creation determination time, compares a creation probability for a value based on a current time with the random number value, and then determines whether to create artificial communication at the current time.

4. The communication server device of claim 1, wherein the creation requesting unit requests a receiving side-communication terminal device to filter the artificial communication received from the transmitting side-communication terminal device.

5. A communication terminal device in an apparatus for protecting a communication pattern of network traffic, comprising:
one or more units being configured and executed by a hardware processor using algorithms which associated with least one non-transitory storage device, the algorithm which when executed, causes the processor to perform the one or more units, the one or more units comprising,
a communication creation unit for, in response to receipt of an artificial communication creation request transmitted from a communication server device, creating artificial communication, the artificial communication creation request being generated during performance of normal communication over a network using the following algorithm;
in response to detection of communication period of the network, the creation determination unit for calculating a probability of artificial communication based on the communication period,
in response to detection of predetermined unit time being elapsed, the creation determination unit for determining to create artificial communication at current time based on the calculated probability of the artificial communication, wherein a random number value of the current time is resulting value obtained by performing a modulo operation on the current time,
in response to detection of the creation of the artificial communication creation request;
a transmission/reception unit for transmitting the created artificial communication to a receiving side-communication terminal device, and receiving artificial communication from a transmitting side-communication terminal device; and
a filtering unit for, if an artificial communication filtering request is received from the communication server device, filtering the artificial communication received from the transmitting side-communication terminal device wherein the creation determination unit calculates a normal distribution, having a value corresponding to half of the communication period of the network as a mean, as the artificial communication creation probability.

6. The communication terminal device of claim 5, further comprising:

a response message generation unit for, if the artificial communication is received or filtered, generating a response message to results of reception or filtering based on a predefined response template.

7. A computer-implemented method using a processor for protecting a communication pattern of network traffic, comprising:

determining, by the processor, whether to create artificial communication during performance of normal communication over a network according to the following steps, the steps comprising, in response to detection of communication period of the network, calculating a probability of artificial communication based on the communication period, in response to detection of predetermined unit time being elapsed, determining to create artificial communication at current time based on the calculated probability of the artificial communication, wherein a random number value of the current time is resulting value obtained by performing a modulo operation on the current time, in response to detection of the creation of the artificial communication, requesting a transmitting side-communication terminal device of the network to create artificial communication, and requesting receiving side-communication terminal device to filter artificial communication, wherein the creation determination unit calculates a normal distribution, having a value corresponding to half of the communication period of the network as a mean, as the artificial communication creation probability.

8. The method of claim 7, wherein determining whether to create artificial communication comprises calculating a probability of artificial communication being created in consideration of a communication period of the network, and determining whether to create artificial communication, based on the calculated artificial communication creation probability.

9. The method of claim 8, wherein determining whether to create artificial communication comprises determining whether to create the artificial communication by additionally considering a preset creation determination time.

10. The method of claim 9, wherein determining whether to create artificial communication comprises:

generating a random number value every creation determination time; and comparing a creation probability for a value based on a current time with the random number value.

11. The method of claim 7, further comprising:

requesting a receiving side-communication terminal device to filter the artificial communication created by the transmitting side-communication terminal device.

* * * * *